(12) United States Patent
Dilger

(10) Patent No.: US 6,775,604 B2
(45) Date of Patent: Aug. 10, 2004

(54) STEERING WHEEL ANGLE DETERMINATION

(75) Inventor: Fritz P. E. Dilger, Royal Oak, MI (US)

(73) Assignee: Continental Teves, Inc., Auburn Hills, MI (US)

(*) Notice: Subject to any disclaimer, the term of this patent is extended or adjusted under 35 U.S.C. 154(b) by 2 days.

(21) Appl. No.: 10/316,649

(22) Filed: Dec. 11, 2002

(65) Prior Publication Data

US 2004/0117088 A1 Jun. 17, 2004

(51) Int. Cl.$^7$ .............................. B62D 6/00; G06F 7/00
(52) U.S. Cl. ........................................ 701/41; 180/6.2
(58) Field of Search ............................. 701/41; 180/6.2, 180/7.1; 340/426.31; 477/1

(56) References Cited

U.S. PATENT DOCUMENTS 5,123,497 A * 6/1992 Yopp et al. ................. 180/422
5,787,375 A   7/1998 Madau et al. ................. 701/41
5,790,966 A   8/1998 Madau et al. ................. 701/41

* cited by examiner

Primary Examiner—Yonel Beaulieu

(57) ABSTRACT

A method is disclosed for determining the steering center of a vehicle. The algorithm involves supplying power to a controller after ignition-off to save the steering wheel angle value that is stored in the controller's non-volatile memory. At ignition-on, the steering wheel angle value that was stored in the controller's non-volatile memory is retrieved and compared to a recently calculated probable steering wheel angle value. The recently calculated probable steering wheel angle value is calculated based on an offset compensated value of the vehicle's yaw rate and offset compensated value of the vehicle's lateral acceleration. If the difference between the value stored in the volatile memory and the recently calculated probable steering wheel angle value are within a predetermined range, the value stored in the non-volatile memory will continue to be used.

15 Claims, 2 Drawing Sheets

STEERING WHEEL ANGLE DETERMINATION

BACKGROUND OF THE INVENTION

It is known to determine the steering center of a moving vehicle. This value is important to know for several different advanced vehicle functions, for example vehicle active yaw control.

Further, it is important to learn this value as early in the driving cycle as possible. The value that is saved in the vehicle's memory when the vehicle is turned off will not be accurate if the steering wheel was turned while the vehicle was off.

One way of determining the steering center of a moving vehicle is the use of an absolute steering wheel angle sensor. An absolute steering wheel angle sensor provides the actual position of the steering wheel at any point in the vehicle's driving cycle. These sensors are rather expensive averaging approximately $30 each.

On the other hand, relative steering wheel angle sensors sense movements of the steering wheel only. This type of sensor does not provide the absolute position of the steering wheel. Rather, in vehicle's utilizing this type of sensor, the steering center position needs to be determined in each ignition cycle. In the beginning of the ignition cycle, it is not known whether the saved steering wheel angle is accurate since there is no way to determine if the steering wheel was turned while the vehicle was off. Relative steering wheel angle sensors average approximately $5 each. Therefore, it is desirable to use the relative steering wheel angle sensor to reduce the overall cost of the vehicle.

It is desirable to use the information that the relative steering wheel angle sensor yields to calculate an accurate absolute steering center value. To yield an accurate absolute steering center value, calculations need to be performed utilizing input from the relative steering wheel angle sensor and other vehicle sensors.

One known procedure for calculating a steering center is to use input from vehicle sensors while the vehicle is driving at a single predetermined speed to determine a steering center angle. This calculated steering center angle is compared with a table including accurate steering wheel angle values for different sensor inputs. The table is stored in the vehicle's memory. If the calculated steering wheel angle value is within a predetermined range of the corresponding value stored in the table then the calculated steering wheel angle value is assumed to be the correct steering wheel angle value.

A first disadvantage of this known procedure is that a significant amount of memory is required to store the table. A second disadvantage is that, while the table requires a significant amount of memory it only involves data corresponding to one vehicle speed. A third disadvantage is that the most recent calculated steering wheel angle center value is assumed to be correct. A fourth disadvantage is that the procedure doesn't take into account misalignments of the front axle.

Therefore, it is desirable to determine an accurate steering center value that is determined very early in the vehicle's driving cycle, performing the minimal number of calculations as possible and utilizing the minimal amount of memory. Further, it is desirable to determine the steering wheel angle center at any vehicle speed and that is robust against misalignments of the front axle.

BRIEF SUMMARY OF THE INVENTION

The present invention overcomes the disadvantages outlined above by providing a method for determining a vehicle's steering wheel angle center utilizing a relative steering wheel angle sensor. Additionally, the present invention provides that information saved in the vehicle's active yaw controller volatile memory will be saved for some period of time after the vehicle is shut down or so long as the vehicle is moving. This is advantageous for vehicles that have stalling problems.

The purpose of the present invention is to quickly determine and verify the accuracy of the steering center angle based on the direction of the vehicle's motion from the vehicle's yaw velocity, lateral acceleration, vehicle velocity, and other input signals. An advantage of the present invention is that the method can be performed while the vehicle is driving at any speed. In other words, it is not limited to accurate values for only one vehicle speed. Further, less memory is required since there is no look-up table that needs to be stored.

In fact, it is the steering center and not the steering wheel center that is found eventually. The invention determines when the yaw velocity is zero or when the vehicle is driving straight ahead, regardless of the position of the steering wheel at this time. Therefore, the invention is robust against misalignments of the front axle.

Further, the vehicle continuously monitors and updates the steering wheel angle.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION OF THE INVENTION

Figure 1:
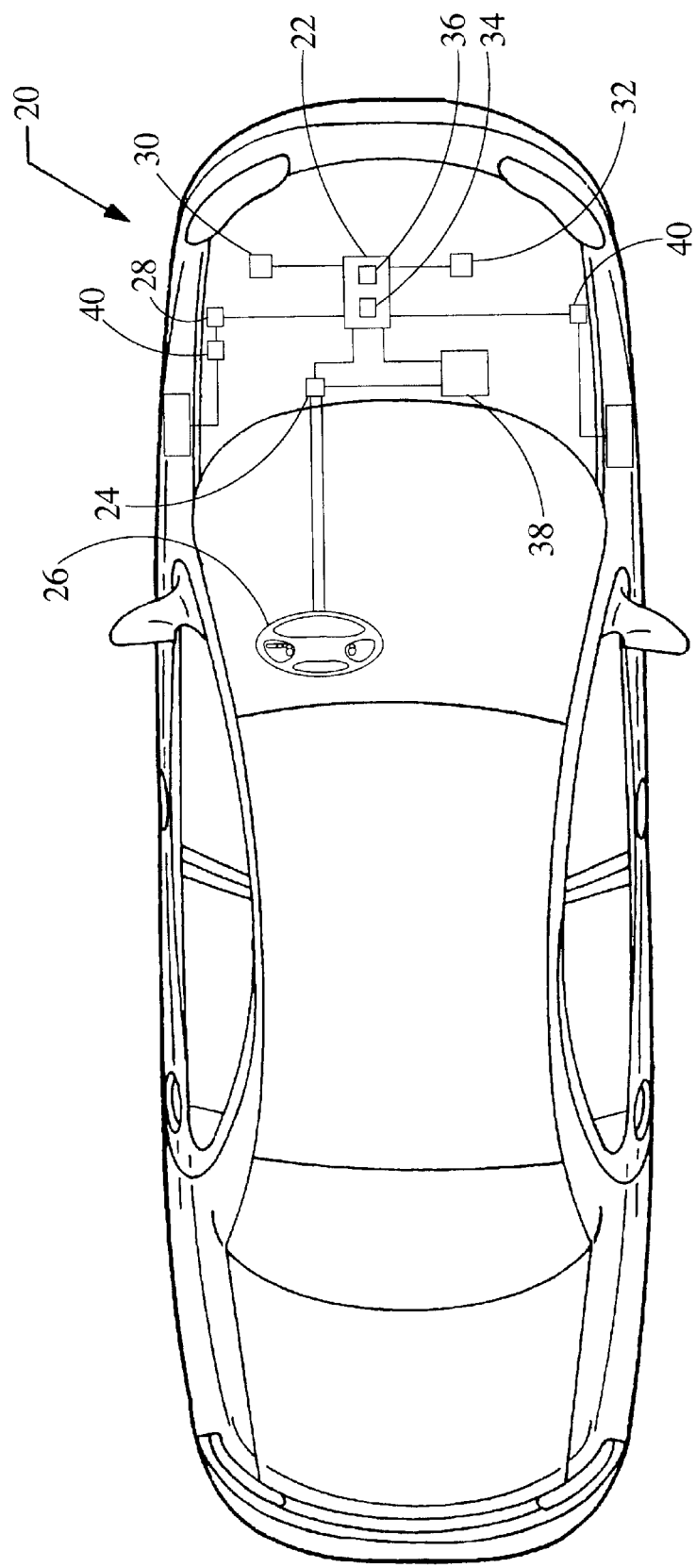
FIG. 1 illustrates a vehicle installed with the present invention.

As shown in FIG. 1, the steering wheel angle center determination algorithm of the present invention is used on a vehicle, shown generally at 20. There are certain sensors and several types of memory that are involved in the proper functioning of the algorithm of the present invention.

Figure 2:
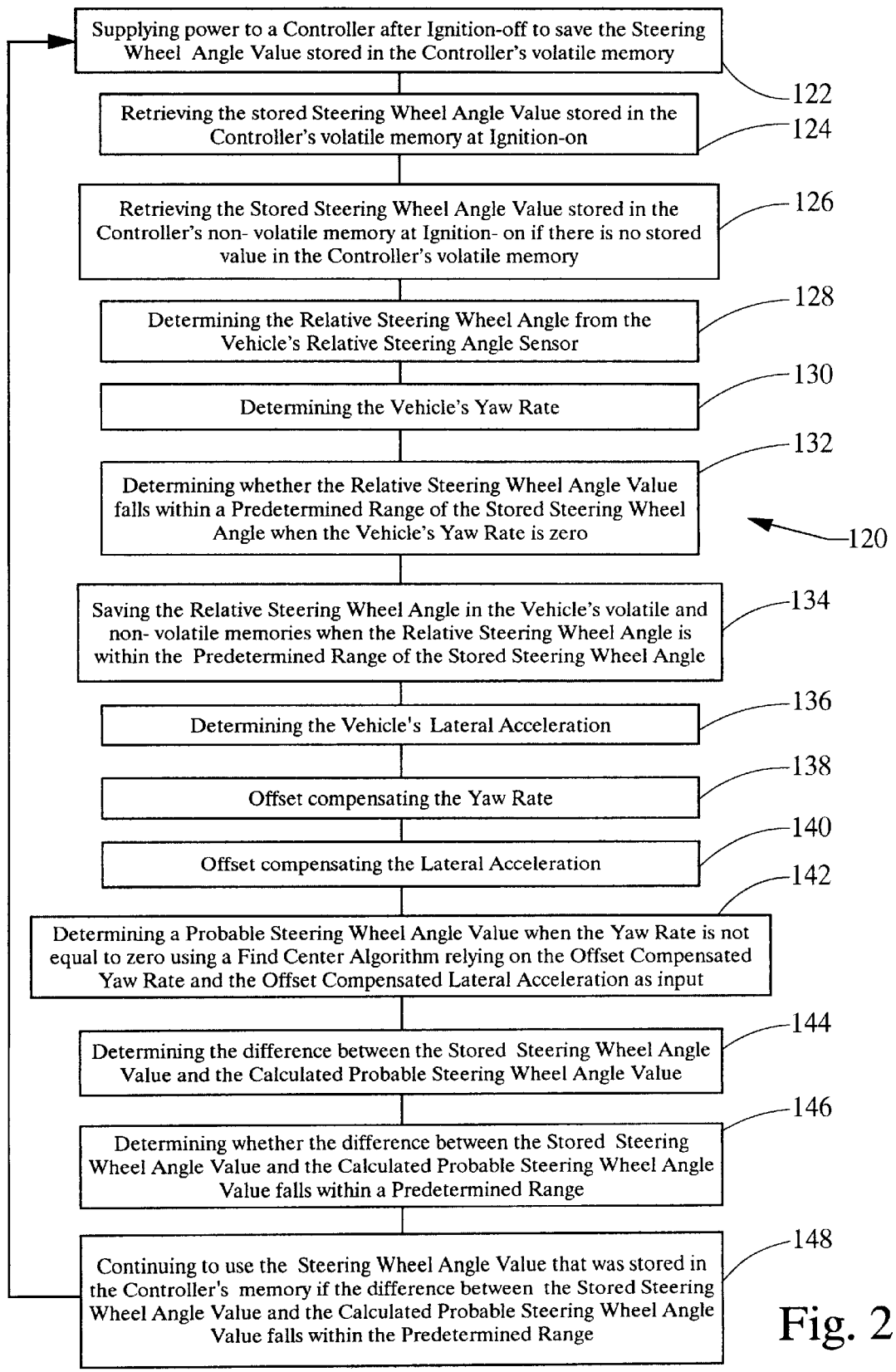
FIG. 2 is a flowchart illustrating the algorithm of the present invention.

The algorithm, shown generally at 120 in FIG. 2, is performed in the active yaw controller 22, which is positioned in the vehicle 20. The controller 22 is in communication with a relative steering wheel angle sensor 24. A relative steering wheel angle sensor 24 senses movements of the steering wheel 26 only. It does not provide the absolute position of the steering wheel 26.

The controller 22 is also in communication with other vehicle sensors. The controller may be in communication with a brake pressure sensor 28. However, communication with a first vehicle parameter sensor, preferably a yaw rate sensor 30, and a second vehicle parameter sensor, preferably a lateral acceleration sensor 32 is critical. Since the yaw rate signal and the lateral acceleration signal are the most important inputs for determining the vehicle's motion, the most accurate signals for these two inputs are essential for the invention. Therefore, the invention includes strategies for calibrating the offsets of these signals at the end of the vehicle assembly line (EOL), after repair at the dealer, at ignition on, and online while the vehicle is under operation.

The controller 22 has a non-volatile memory 34 in which certain information is stored and not cleared or lost when the vehicle 20 is turned off. The controller 22 also has a volatile memory 36 in which certain information is stored and historically has been cleared or lost when the vehicle is turned off.

The present invention requires that the information stored in the volatile memory 36 be maintained even after the vehicle 20 either has been turned off or has stalled under certain circumstances. This mode of operation is called the Keep Alive Mode. During the Keep Alive Mode, power is supplied to the controller 22 for some predetermined period of time even though the vehicle 20 is off, shown at 122. By supplying power to the controller 22, the controller 22 maintains the information stored in its volatile memory 36. Power is supplied to the controller 22 by a battery 38. The battery 38 is preferably a typical battery that supplies power to vehicle accessories.

One method of determining whether to continue supplying power to the controller 22 after the vehicle 20 is off is to determine if the vehicle 20 is still moving. So long as the vehicle 20 is moving, power will be supplied to the controller 22. One way to determine if the vehicle 20 is moving is to determine the velocity of the vehicle 20 from at least two wheel speed sensors 40.

Another method of determining whether to continue supplying power to the controller 22 after the vehicle 20 is off is to evaluate the amount of noise or disturbance in the yaw rate signal. The amount of noise or disturbance detected in the yaw rate signal is a good indicator of the road surface condition that the vehicle was driving along.

If no noise or disturbance is detected and the vehicle 20 is not moving, an assumption is made that the vehicle 20 was driving along a smooth road and that the vehicle 20 was most likely deliberately turned off by the vehicle's driver. Therefore, power is no longer supplied to the controller 22 after ignition off. In other words, the controller 22 does not operate in the Keep Alive Mode.

On the other hand, if a significant amount of noise or disturbance is detected, an assumption is made that the vehicle 20 was driving along a rough road and that the vehicle 20 most likely stalled. It is very likely that the vehicle 20 will be restarted within a short period of time if it did in fact stall. Therefore, power continues to be supplied to the controller 22 after ignition off and the controller 22 is now operating in the Keep Alive Mode. As a result, the information stored in the volatile memory 36 will be maintained, so long as the vehicle 20 is restarted within the predetermined time range. Once the predetermined time range has elapsed after ignition off and rough road conditions detected, power will no longer be supplied to the controller 22 and the information stored in the volatile memory 36 will be cleared.

When the vehicle 20 is started, or at ignition, the controller 22 looks for the steering wheel angle stored in the volatile memory 36. If a steering wheel angle value is found in the volatile memory 36, as shown at 124, that value continues to be used. If a value is in fact found, then the controller 22 was operating in the Keep Alive Mode. On the other hand, if the controller 22 does not find a steering wheel angle value in the volatile memory 36, the algorithm needs to start from the beginning to determine and validate a steering wheel angle value.

The controller 22 first uses the steering wheel angle value that is stored in the non-volatile memory 34, as shown at 126. An assumption is made that the value is correct and it is used as a base.

Next the controller 22 verifies the accuracy of the steering wheel angle value that was stored in non-volatile memory 34. The controller 22 also learns a current yaw rate value, as shown at 130, and a current lateral acceleration value of the vehicle 20, as shown at 136. These values are learned from the yaw rate sensor 30 and the lateral acceleration sensor 32 respectively.

Both the yaw rate value and lateral acceleration value need to be offset compensated, as shown at 138 and 140. However, the offset compensation can only be performed while the vehicle is standing still. Therefore, if the vehicle 20 is not moving, the offset compensation calculations will be performed immediately. On the other hand, if the vehicle 20 is moving, either forward or backward, the offset compensation calculations will be performed once the vehicle 20 is in a stopped position.

To determine whether the vehicle 20 is moving or resting, the wheel speeds and brake pressure are determined. In most cases, if the wheel speeds are zero and there is brake pressure, the vehicle 20 is resting. Otherwise, in most cases, the vehicle 20 is moving.

As soon as the offset calibration can be performed, the offset calibration values for the yaw rate and the lateral acceleration are determined. The offset calibration values for the yaw rate and the lateral acceleration are then stored in the controller's non-volatile memory 34. At this point, the yaw rate and lateral acceleration values that were stored in the non-volatile memory 34 and the offset compensated values for the yaw rate and lateral acceleration are known.

Now, a determination needs to be made regarding the vehicle's driving conditions. There are three different categories of driving scenarios that are relevant for the present invention. The categories are level zero (0), level one (1), and level three (3). For purposes of the p resent invention, levels zero and three will be grouped together since they cover very similar driving scenarios.

The first category, level zero (0), is when the vehicle 20 is driving down a straight path at a low speed, or at a speed less than a predetermined value. The second category, level three (3), is when the vehicle 20 is driving down a straight path at a speed greater than a predetermined value. The third category, level one (1), is when the vehicle 20 is turning. The controller 22 looks to the vehicle's yaw rate, lateral acceleration and vehicle speed to determine the vehicle's present driving scenario, and thus, determines the appropriate driving category.

For levels zero (0) and three (3), since the vehicle 20 is driving forward down a straight path the yaw rate will equal zero. Therefore, the relative steering wheel angle sensor signal determined from the vehicle's relative steering wheel angle sensor is assumed to produce a value that corresponds to driving straight, shown at 128 and 132. The steering wheel angle value that is stored in the non-volatile memory 34 is replaced with the new value, as shown at 134.

If the vehicle 20 is driving in the reverse direction, the algorithm will not replace the steering wheel angle that is saved in the non-volatile memory 34. Rather, the stored steering wheel angle will only be replaced with the recently detected steering wheel angle when the new value is calculated while the vehicle 20 is driving in the forward direction. Therefore, the controller 22 will wait until the vehicle 20 is driving in the forward direction before altering the steering wheel angle stored in non-volatile memory 34.

For level one (1), since the vehicle 20 is not driving down a straight path the yaw rate will not equal zero. Further, the vehicle 20 needs to be driving at a speed greater than a predetermined minimum speed. Therefore, a more complex calculation needs to be performed to determine the current steering wheel angle of the vehicle 20, taking into account the vehicle's yaw rate and lateral acceleration.

A Find Center Algorithm is performed to determine a probable steering angle value, as shown at 142. There are two equations used to determine steering angles. The first equation determines the vehicle's steering angle based on the vehicle's yaw rate among other variables. The first equation is:

$$\delta(r) = r \left[ \frac{1 + \frac{Kv^2}{57.3 Lg}}{\frac{v}{L}} \right]$$

The second equation determines the vehicle's steering angle based on the vehicle's lateral acceleration among other variables. The second equation is:

$$\delta(a_y) = a_y \left[ \frac{1 + \frac{Kv^2}{57.3 Lg}}{\frac{v^2}{57.3 Lg}} \right]$$

The following list is inclusive of all the variables and constants used in the two steering angle equations.

$a_y$=lateral acceleration (g)
$\delta$=average steering angle at the front wheels (deg)
v=forward speed of the vehicle (ft/sec)
L=wheelbase (ft)
g=gravitational acceleration constant=32.2 ft/sec$^2$
K=understeer gradient (deg/g)
r=yaw rate (rate of rotation in heading angle)

The two steering angle values are averaged to yield the probable steering angle value, $\delta$. The equations to determine the average of the two steering angles or the probable steering angle value is: $\delta=[\delta(r)+\delta(a_y)]/2$.

The probable steering angle value, $\delta$, is the probable tire steer angle. From this steering angle a steering wheel angle is calculated using the steering ratio. The steering ratio is the ratio between the steering wheel and the tire steer angle and is a parameter of the individual vehicle. It is stored in non-volatile memory.

In other words, a function then needs to be performed to convert the probable tire steer angle to the probable steering wheel angle. The function to determine the probable steering wheel angle is different for each vehicle model. Further, each vehicle's individual function is typically linear up to a predetermined angle. Beyond the predetermined angle, the function is generally a nonlinear function of the ratio between the tire steer angle and the steering wheel angle.

The probable steering wheel angle of the vehicle 20 that is determined from the equations explained above is compared to the steering wheel angle that was saved in the controller's non-volatile memory 34, as shown at 144. If the current steering wheel angle falls within a constant predetermined range then the steering wheel angle that was stored in the non-volatile memory 34 is not replaced, as shown at 146 and 148. The logic in keeping the stored steering wheel angle value and not replacing it with the new calculated steering wheel angle value is that the stored value is more accurate. It is deemed to be more accurate because it has been updated throughout the driving cycle of the vehicle 20.

On the other hand, if the probable steering wheel angle of the vehicle 20 falls outside of the constant predetermined range when compared to the steering wheel angle that was stored in the controller's non-volatile memory 34 then the controller 22 continues to monitor the system. If the current steering wheel angle value is outside of the constant predetermined range by at least two times, a timer begins running. At certain predetermined time intervals the comparison will be made between the current steering wheel angle and the steering wheel angle stored in non-volatile memory 34. If the current steering wheel angle does not fall within the predetermined range during the monitoring period then a failure signal is communicated to the driver of the vehicle 20.

The present invention continuously monitors and updates the steering wheel angle throughout the duration of the drive cycle. The confidence levels, ranging from the lowest to the highest are as follows: 1) level 3 on rough road; 2) level 1; 3) level 0; and 4) level 3 on normal road. The least accurate steering wheel angle is determined when the vehicle 20 is driving straight down a rough surface at a high velocity. Moving up the scale, the next most accurate steering wheel angle is determined when the vehicle 20 is turning. Next on the scale is the second from the highest category, or the steering wheel angle determined when the vehicle 20 is driving straight down a normal surface at a low velocity. Finally, the most accurate steering wheel angle is determined when the vehicle 20 is driving straight down a normal surface at a high velocity.

The system continuously monitors the driving conditions and updates the steering wheel angle that is stored in the volatile and non-volatile memories 36, 34 as more information becomes available relating to the vehicle's driving conditions. Further, the system does not redetermine a steering wheel angle at a lower confidence level once a higher confidence level has been reached for any one driving cycle. For example, at the point that the vehicle 20 is started or at ignition on it is determined that the vehicle is turning, the steering wheel angle will be determined based on the level one (1) calculations described above. Once it is determined that the vehicle 20 is driving straight, the steering wheel angle will be reevaluated to determine if it needs to be updated based on the calculations described for levels zero (0) or three (3) depending on the speed of the vehicle.

While the above description constitutes the preferred embodiment of the present invention, it will be appreciated that the invention is susceptible to modification, variation and change without departing from the proper scope and fair meaning of the accompanying claims.

What is claimed is:

1. A method for determining a steering wheel angle value of a vehicle's steering mechanism, comprising the steps of:

supplying power to a controller after ignition-off to save the steering wheel angle value stored in the controllers' volatile memory;

retrieving the steering wheel angle value stored in the controller's volatile memory at ignition-on;

determining a first vehicle parameter;

determining a second vehicle parameter;

offset compensating the first vehicle parameter;

offset compensating the second vehicle parameter;

determining a probable steering wheel angle value using a Find Center Algorithm relying on the offset compensated first vehicle parameter and the offset compensated second vehicle parameter as input;

determining the difference between the stored steering wheel angle value and the calculated probable steering wheel angle value;

determining whether the difference between the stored steering wheel angle value and the calculated probable steering wheel angle value falls within a predetermined range; and continuing to use the steering wheel angle value that was stored in the controller's volatile memory if the difference between the stored steering wheel angle value and the calculated probable steering wheel angle value falls within the predetermined range.

2. The method of claim 1 wherein power is supplied to the controller so long as the vehicle is moving.

3. The method of claim 1 wherein power is supplied to the controller after ignition off for a predetermined period of time.

4. The method of claim 3 further comprising the steps of:
determining the yaw rate signal of the vehicle at ignition-off;
determining the amount of disturbance in the yaw rate signal;
supplying power to the controller after ignition-off if the amount of disturbance in the yaw rate signal exceeds a predetermined amount.

5. The method of claim 1 wherein the first vehicle parameter is the yaw rate of the vehicle and the second vehicle parameter is the lateral acceleration of the vehicle.

6. The method of claim 1 further comprising the steps of:
determining whether the vehicle is moving or in a resting position; and
postponing offset compensating the first vehicle parameter and the second vehicle parameter if the vehicle is moving until the vehicle comes to a resting position.

7. The method of claim 6 wherein determining whether the vehicle is resting comprises the steps of:
determining at least two wheel speeds in the vehicle;
determining brake pressure in the vehicle;
determining if the wheel speeds equal zero; and
determining if the brake pressure is greater than zero.

8. The method of claim 1 wherein the first vehicle parameter is the yaw rate, and the wheel base of the vehicle, the gravitational acceleration constant and the understeer gradient of the vehicle are stored in the controller's non-volatile memory, the method further comprising the steps of:
determining when the yaw rate (r) is not equal to zero;
determining the speed (v) of the vehicle;
retrieving the wheel base (L) of the vehicle;
retrieving the gravitational acceleration constant (g);
retrieving the understeer gradient (K) of the vehicle; and
determining the steering angle based on the vehicle's yaw rate ($\delta(r)$) wherein $$\delta(r) = r\left[\frac{1 + \frac{Kv^2}{57.3Lg}}{\frac{v}{L}}\right].$$

9. The method of claim 8 wherein the second vehicle parameter is the lateral acceleration ($a_y$), the method further comprising the step of determining the steering angle based on the vehicle's lateral acceleration ($\delta(a_y)$) wherein $$\delta(a_y) = a_y\left[\frac{1 + \frac{Kv^2}{57.3Lg}}{\frac{v^2}{57.3Lg}}\right].$$

10. The method of claim 9 wherein the calculated probable steering angle value ($\delta$) is the average of the steering angle based on the vehicle's yaw rate ($\delta(r)$) and the steering angle based on the vehicle's lateral acceleration ($\delta(a_y)$), $\delta=[\delta(r)+\delta(a_y)]/2$.

11. The method of claim 10 further comprising determining a probable steering wheel angle where the function is a ratio between the probable steering angle value and a steering wheel angle.

12. The method of claim 1 further comprising the step of continuously monitoring the first and second vehicle parameters.

13. The method of claim 1 wherein the controller is the vehicle's active yaw controller.

14. A method for determining a steering wheel angle value of a vehicle's steering mechanism, comprising the steps of:
supplying power to a controller after ignition-off to save the steering wheel angle value stored in the controllers' volatile memory;
retrieving the stored steering wheel angle value stored in the controller's volatile memory at ignition-on;
retrieving the stored steering wheel angle value stored in the controller's non-volatile memory at ignition-on if there is no stored value in the controller's volatile memory;
determining the relative steering wheel angle from the vehicle's relative steering wheel angle sensor;
determining the vehicle's yaw rate;
determining whether the relative steering wheel angle value falls within a predetermined range of the stored steering wheel angle when the vehicle's yaw rate is zero;
saving the relative steering wheel angle in the vehicle's volatile memory when the relative steering wheel angle is within the predetermined range of the stored steering wheel angle;
determining the vehicle's lateral acceleration;
offset compensating the yaw rate;
offset compensating the lateral acceleration;
determining a probable steering wheel angle value when the yaw rate is not equal to zero using a Find Center Algorithm relying on the offset compensated yaw rate and the offset compensated lateral acceleration as input;
determining the difference between the stored steering wheel angle value and the calculated probable steering wheel angle value;
determining whether the difference between the stored steering wheel angle value and the calculated probable steering wheel angle value falls within a predetermined range; and
continuing to use the steering wheel angle value that was stored in the controller's non-volatile memory if the difference between the stored steering wheel angle value and the calculated probable steering wheel angle value falls within the predetermined range.

15. The method of claim 14 wherein the Find Center Algorithm includes:
  determining when the yaw rate (r) is not equal to zero;
  determining the speed (v) of the vehicle;
  retrieving the wheel base (L) of the vehicle;
  retrieving the gravitational acceleration constant (g);
  retrieving the understeer gradient (K) of the vehicle;
  determining the steering angle based on the vehicle's yaw rate ($\delta(r)$) wherein $$\delta(r) = r \left[ \frac{1 + \frac{Kv^2}{57.3 Lg}}{\frac{v}{L}} \right];$$

determining the steering angle based on the vehicle's lateral acceleration ($\delta(a_y)$) wherein $$\delta(a_y) = a_y \left[ \frac{1 + \frac{Kv^2}{57.3 Lg}}{\frac{v^2}{57.3 Lg}} \right];$$

determining the probable steering angle value ($\delta$) wherein $\delta = [\delta(r) + \delta(a_y)]/2$; and
  determining a probable steering wheel angle where the function is a ratio between the probable steering angle value and a steering wheel angle.

* * * * *